June 10, 1924.
C. E. BEDELL
Re. 15,858
FURNACE CHARGING APPARATUS
Original Filed June 2, 1911 2 Sheets-Sheet 1
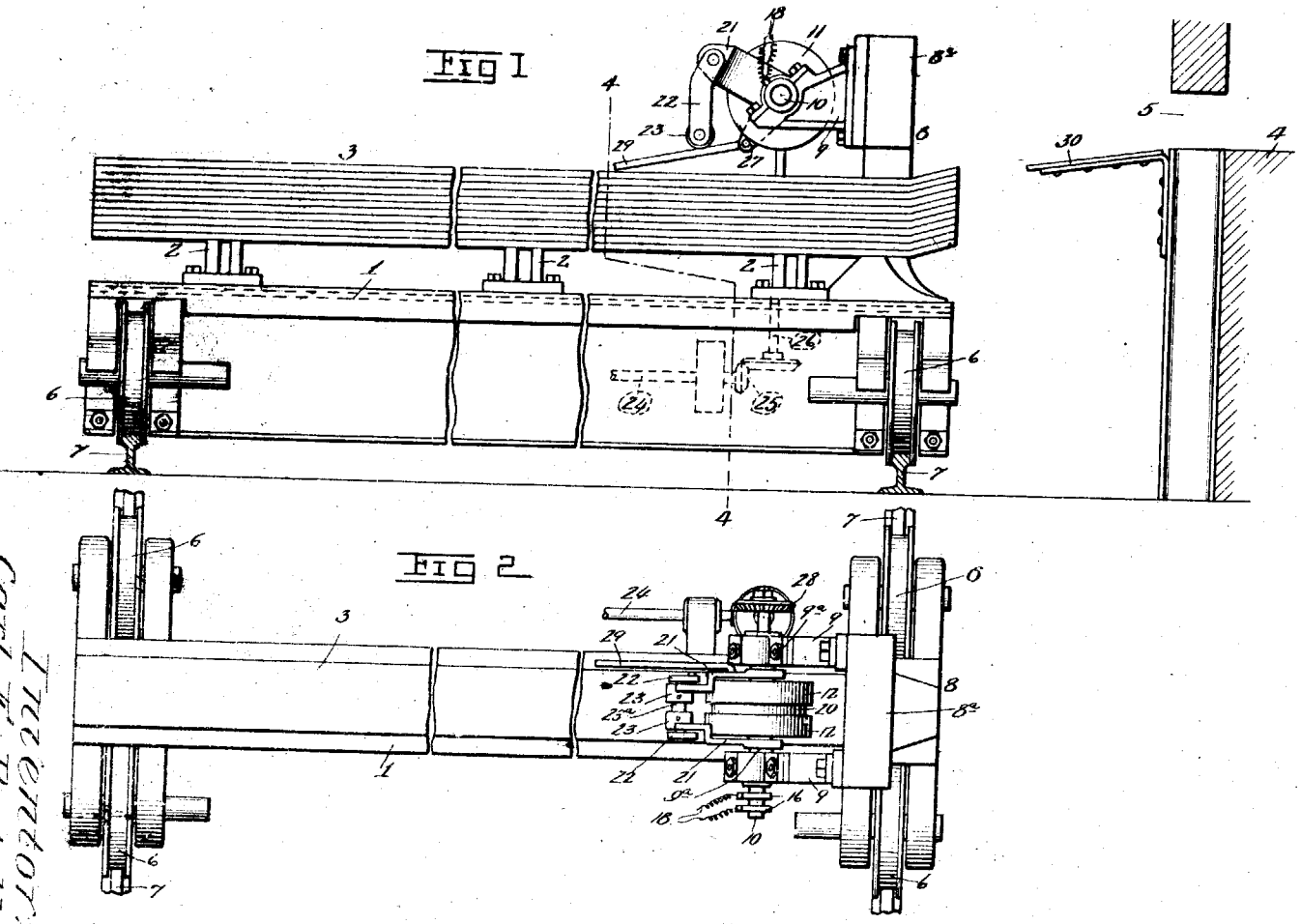
Inventor:
Carl E. Bedell
By Wallace R. Lane
Attys June 10, 1924. Re. 15,858

C. E. BEDELL

FURNACE CHARGING APPARATUS

Original Filed June 2, 1911 2 Sheets-Sheet 2

Inventor:
Carl E. Bedell
by Wallace R. Lane
Atty.

Reissued June 10, 1924. Re. 15,858

UNITED STATES PATENT OFFICE.

CARL E. BEDELL, OF WHEELING, WEST VIRGINIA, ASSIGNOR, BY DIRECT AND MESNE ASSIGNMENTS, TO TAYLOR-WILSON MANUFACTURING COMPANY, OF PITTSBURGH, PENNSYLVANIA, A CORPORATION OF PENNSYLVANIA.

FURNACE-CHARGING APPARATUS.

Original No. 1,012,235, dated December 19, 1911, Serial No. 630,966, filed June 2, 1911. Application for reissue filed November 19, 1921. Serial No. 516,487.

*To all whom it may concern:*

Be it known that I, CARL E. BEDELL, a citizen of the United States of America, and resident of Wheeling, county of Ohio, and State of West Virginia, have invented certain new and useful Improvements in Furnace-Charging Apparatus, of which the following is a specification.

This invention relates broadly to furnace-charging apparatus, and specifically to an automatic device for charging metal into a heating furnace.

The primary object of the invention is to provide a mechanical device whereby skelp and like material may be conveniently and expeditiously introduced into a furnace.

A further object is to provide a device for charging material into a heating furnace, which is located wholly without and is wholly disconnected from the furnace, whereby a powerful thrust may be given the material for directing the latter comparatively long distances, and whose throw may be regulated for depositing the material at desired points by simply increasing or reducing the speed of a motor or other power mechanism employed for driving.

Another object within the contemplation of the invention is to provide in a charging apparatus a revolving magnetic wheel whereby the metal is seized and delivered or directed forward into the furnace.

With these and other important objects in view, the invention finally consists in the features of construction, arrangement of parts and combinations of elements which will hereinafter be exemplified, reference being had to the accompanying drawings, forming a part of this specification, in which—

Figure 1 is a side elevation of the invention, the elevating mechanism being shown in inoperative position.

Figure 2 is a top plan view of the same.

Figure 5:
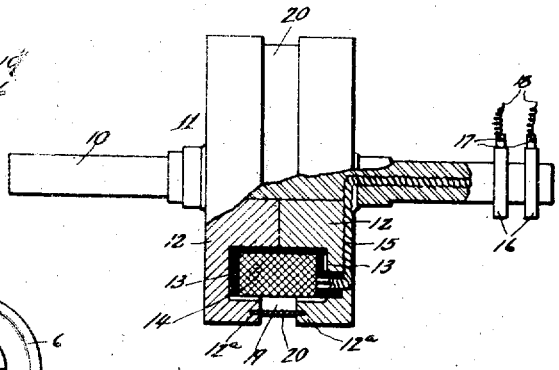
Figure 5 is an enlarged detail view, partly in section, of the magnetic wheel.

Referring to said drawings, in which like designating characters distinguish like parts throughout the several views,—1 indicates a loading table or bench which has a plurality of supports 2 mounted on its top for supporting the pile 3 of plates, skelp, or other material, to be charged into the heating furnace 4, said table being located in front of the mouth or door 5 of the furnace, and being, preferably, mounted upon wheels 6 and arranged to travel along track-rails 7 across the front of the furnace, whereby the machine may be adjusted to any desired position with respect to the latter. Mounted upon the front end of the table and located laterally of the position occupied by the pile 3 of material to be charged, is the upright member of an angular supporting frame 8 which has a member $8^a$ in overhanging relation to said pile. Brackets 9 are mounted on the rear face of the frame member $8^a$. Said brackets are either magnetically isolated from the frame, or are made of brass or other non-magnetic material. Journaled in said brackets so as to lie transversely of the table, is a shaft 10 upon which is fixed a magnetic wheel, designated generally by the numeral 11. Said wheel comprises a pair of circular disks 12 having portions of their opposing faces in engagement, substantially as shown in Fig. 5. Provided in the adjacent faces of said disks are oppositely facing circular grooves or channels 13, concentric with said disks, in which is mounted a circular magnet coil 14, insulated from said disks, to which leads a pair of current-conducting wires 15, the latter being herein shown as leading through or along a channel provided therefor in the shaft 10 and in one of the disks 12. Slip rings 16 mounted on and insulated from said shaft have brushes 17, to which lead wires 18, in contact therewith. An annular air-space 19 is provided between the coil 14 and the periphery of the wheel 11, and a shield, or protecting ring 20, of non-magnetic material is shown disposed across said air-space and mounted in the opposing disk flanges $12^a$.

The centers or engaging body portions of the disks 12 and the shaft 10 together constitute a core for the magnet, and the separated peripheral flanges $12^a$ of the disks constitute the poles of the magnet. Magnetism is communicated from the magnet wheel 11 across narrow intervening air-gaps to a pair of arms 21. Said arms are located on opposite sides of wheel 11 and each has one end loosely mounted on a boss 9[a] carried by the adjacent bracket 9. Magnetism is thence transmitted to a pair of arms 22 one of which is pivotally connected to and depends from the outer end of each arm 21, and thence is transmitted to a pair of rollers 23 of magnetic material which are mounted on a brass shaft 23[a] whose opposite ends are journaled in the opposite lower ends of said arms 22.

To provide for lifting but one piece of skelp at a time, rollers 23 are arranged so as to be laterally adjustable on shaft 23[a]. By varying the distance of the rollers from the magnetized arms 22, the lifting power of said rollers will be strengthened or weakened respectively as the air gap between rollers 23 and their respective arms 22 is diminished or increased.

While the construction or arrangement above described for varying the strength or lifting power of the rollers is deemed preferable, it is obvious that other strength varying means may be employed, if desired.

The weight of the arms 21 and 22 and rollers 23 normally maintains the latter in engagement with the topmost piece of skelp in the pile 3; hence, magnetism is communicated to the said topmost piece and, when said rollers are elevated, the front end of said piece is elevated therewith.

The wheel 11 is driven at a rapid rate of speed, any preferred form of gearing or driving mechanism being employed. The gearing herein shown comprises a horizontal drive shaft 24 having bevel gear connection, as shown at 25, with a vertical shaft 26 which is, in turn, connected by bevel gears, as shown at 28, to shaft 10.

Figure 3:
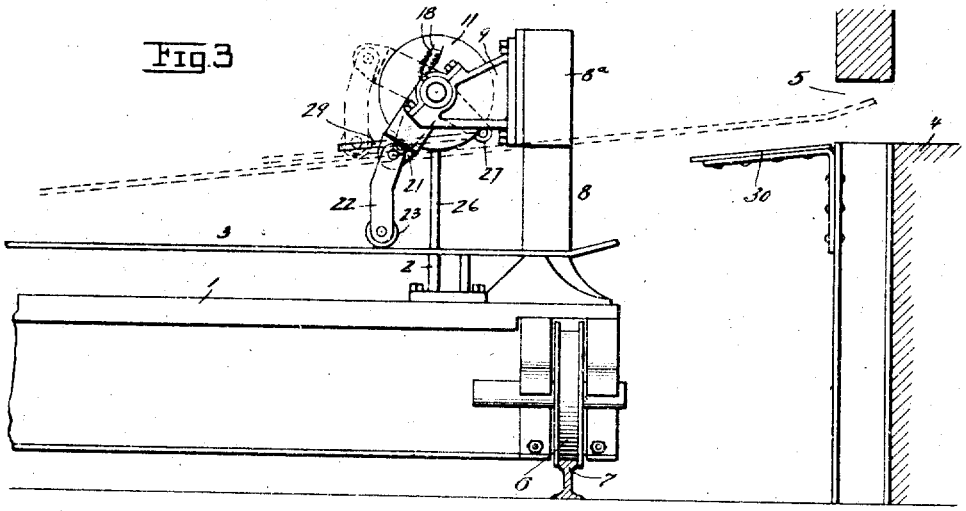
Figure 3 is a view similar to Figure 1, showing the parts of the invention in normal operative position.
Figure 4:
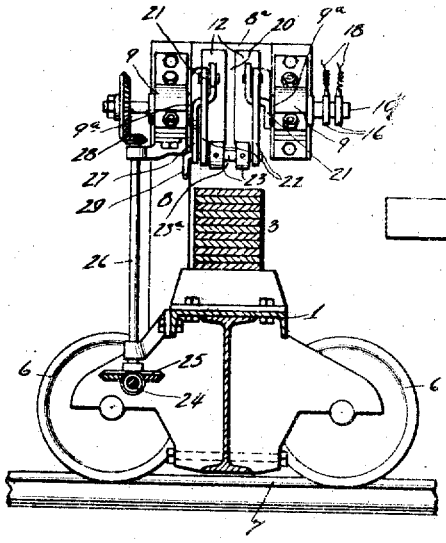
Figure 4 is a cross section on the line 4—4 of Figure 1.

For elevating the rollers 23 to effect the raising of the front end of a piece of skelp into engagement with the periphery of the magnetic wheel 11, any appropriate means may be employed, that herein shown being at present preferred on account of its simplicity, and consisting of a crank arm 27 fixed to, or formed integral with, one of the arms 21, giving the latter substantially bell crank form, and an operating lever 29 pivotally connected to the lower, or free, end of said arm 27. As is obvious, a rearwardly directed pull upon the lever 29 effects the elevation of arms 21 and 22 and of rollers 23, as shown in full lines in Fig. 1 and in dotted lines in Fig. 3. The piece of metal is elevated from the table with the rollers 23 and is thus carried into contact with the periphery of the rapidly rotating wheel 11, as shown in Fig. 3 wherein in full lines the device is shown in the act of picking up the last sheet of the pile. Being elevated against said wheel, the plate is seized thereby, owing to the magnetism of the wheel, and is carried forward over the furnace apron 30 and through the open mouth or door 5 into the furnace, as shown in dotted lines in Fig. 3. The force of the thrust and, consequently, the distance over which the metal piece is projected into the furnace is dependent upon the speed of the magnetic wheel. Hence, to regulate the force of the thrust, the speed of the wheel is increased or reduced as required.

From the foregoing it will be seen that I provide a novel, durable and efficient furnace-charging apparatus which is extremely simple in its construction and which requires the services of but one man in its operation.

It will be obvious that various changes in the construction and arrangement of parts composing the machine may be resorted to without departing from the general spirit or scope of the invention as defined in the appended claims.

Having now described my invention, I claim:—

1. The combination with a loading table, of a charging apparatus comprising a frame in overhanging relation to said table, a rotating magnetic wheel supported by said frame over said table, and means for elevating metal from said table into contact with said wheel.

2. The combination with a loading table, of a charging apparatus comprising a frame in overhanging relation to said table, a rotating magnetic wheel supported by said frame over said table, and manually operated mechanism for elevating metal from said table into contact with said wheel.

3. The combination with a loading table, of a charging apparatus comprising a frame in overhanging relation to said table, a rotating magnetic wheel supported by said frame over said table, and lever actuated mechanism for elevating metal from said table into contact with said wheel.

4. The combination with a loading table, of a charging apparatus comprising a frame in overhanging relation to said table, a rotating magnetic wheel supported by said frame over said table, magnetized rollers normally in engagement with the topmost metal plate carried by said table, and means for elevating said roller to effect the raising of said plate into contact with the periphery of said wheel.

5. The combination with a movable support, of a frame mounted in fixed overhanging relation to said support, a wheel journaled to rotate on said support, means whereby said wheel is magnetized, and means for elevating metal plates from said support into contact with the periphery of said wheel.

6. In a furnace-charging apparatus, the combination with a loading table and plate elevating mechanism, of a rotary magnetic wheel mounted over said table, said wheel comprising a pair of circular disks, a circular magnet coil disposed between opposing faces of said disks, and means for conducting current to said coil.

7. In a furnace-charging apparatus, the combination with a loading table and plate elevating mechanism, of a rotary magnetic wheel mounted over said table, said wheel comprising a pair of circular disks having oppositely disposed circular grooves in their adjacent faces, and a circular magnet coil located in an electric circuit and seated in said grooves, an open air-space being formed between said coil and the plane of the periphery of said disks.

8. In a furnace-charging apparatus, the combination with a loading table and plate elevating mechanism, of a rotary magnetic wheel mounted over said table, said wheel comprising a pair of circular disks having oppositely disposed circular grooves in their adjacent faces, a circular magnet coil located in an electric circuit and seated in said grooves, an open air-space being formed between said coil and the plane of the periphery of said disks, and a shield-like annular ring disposed across said air-space.

9. The combination with a support, of a frame mounted in overhanging relation to said support, a shaft journaled in said frame, driving means for said shaft, a magnetized wheel fixed on said shaft, a series of pivoted arms loosely connected to said shaft, magnetized rollers carried by said arms and normally having engagement with the topmost of metal plates carried by said support, and means for elevating said arms and rollers to effect the raising of said topmost plate against the periphery of said wheel.

10. The combination with a support, of a frame mounted in overhanging relation to said support, a shaft journaled in said frame, driving means for said shaft, a magnetized wheel fixed on said shaft, a series of pivoted arms loosely connected to said shaft, magnetized rollers carried by said arms in adjustable relation thereto and normally having engagement with the topmost of metal plates carried by said support, a crank-arm whereby said arms and rollers may be elevated, and an operating lever connected to said crank-arm whereby a pull upon the latter will elevate said arms and rollers for lifting a plate into contact with the periphery of said wheel.

11. In a furnace charging apparatus, a loading table adjacent to and adjustable across the charging mouth of a heating furnace, said table being adapted to support magnetizable material to be charged into the furnace, a charging wheel in operative relation to and having surface travel toward the furnace, means for causing said magnetizable material to contact with the charging wheel, means for rapidly rotating the wheel, an electrically energized magnet comprising spaced pole members and so disposed as to cause magnetic flux from one pole to the other of the magnet to pass into the magnetizable material for drawing the magnetizable material into frictional gripping contact with the wheel, whereby the wheel is caused to seize and project said material into the furnace with a powerful thrust, and means for energizing said magnet.

12. In a furnace charging apparatus, a loading table adjacent to and adjustable across the charging mouth of a heating furnace, said table being adapted to support magnetizable material to be charged into the furnace, a charging wheel having surface travel toward the furnace, the axis of the charging wheel being transverse of the table and furnace, means for rapidly rotating said wheel, a magnet so located as to draw the magnetizable material into contact with the wheel for seizing and carrying the magnetizable material forward and projecting it with a powerful thrust into the furnace, and means for causing the magnetizable material on the table to contact with the charging wheel.

In witness whereof, I have hereunto subscribed my name to this specification.

CARL E. BEDELL.